Oct. 11, 1960

J. L. CULBERTSON 2,956,183

VOLTAGE MULTIPLIER

Filed Aug. 1, 1957

United States Patent Office 2,956,183
Patented Oct. 11, 1960

2,956,183

VOLTAGE MULTIPLIER

John L. Culbertson, Harvey, Ill., assignor to International Telephone and Telegraph Corporation, New York, N.Y., a corporation of Maryland Filed Aug. 1, 1957, Ser. No. 675,725

6 Claims. (Cl. 307—109)

This invention relates in general to voltage multipliers and in particular to direct-current voltage multipliers of the type employing diode-gated storage devices. Its principal object is to provide a simple and reliable voltage multiplier of the above type wherein the multiplying factor, or ratio of output voltage to input voltage, can be varied by increments.

In known voltage multipliers employing diode-gated storage devices, a commercial alternating-current source is normally employed to charge a first condenser in response to each positive half-cycle of alternating current and to charge a second condenser in response to each succeeding negative half-cycle thereof, the negative half-cycles automatically gating control diodes which cause the charge on the first condenser to be transferred to the second condenser, such that the resulting charge thereon corresponds to twice the peak voltage of the supply source. Voltage multipliers of the above type have the disadvantage that (1) the output voltage is fixed with respect to the supply voltage and any amplitude control thereover must be accomplished by bleeder networks in the output circuit, and (2) they are not capable of being powered from a standby direct-current source in the event of commercial power failure. Thus, the known voltage multipliers are impractical in telephone systems and the like in which positive operation is required at all times and in which low power consuming equipment is desired.

According to the invention, both of the noted disadvantages of the prior-art arrangement are substantially overcome by (1) powering the voltage multiplier from a direct-current source, and (2) by providing control arrangements for selectively controlling the multiplying factor of the voltage multiplier without the need for large power-consuming bleeder networks.

An additional feature of the invention is that the ripple voltage in the output may be substantially lessened without altering the power source whereas in the prior-art multiplier, the ripple voltage is primarily controlled by the fixed frequency of the commercial power source and thus cannot be easily reduced.

Figure 1:
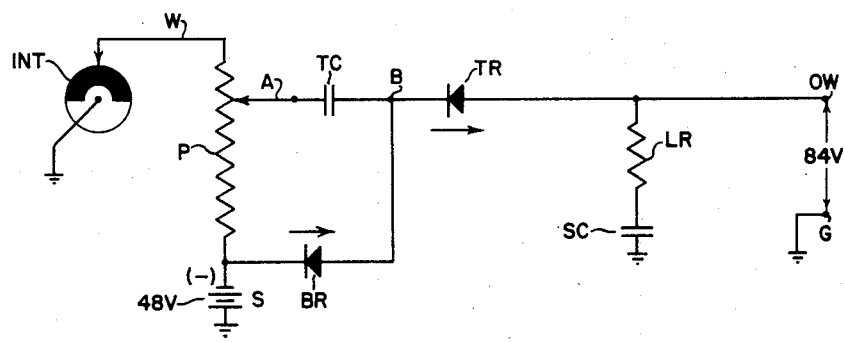
Figure 2:
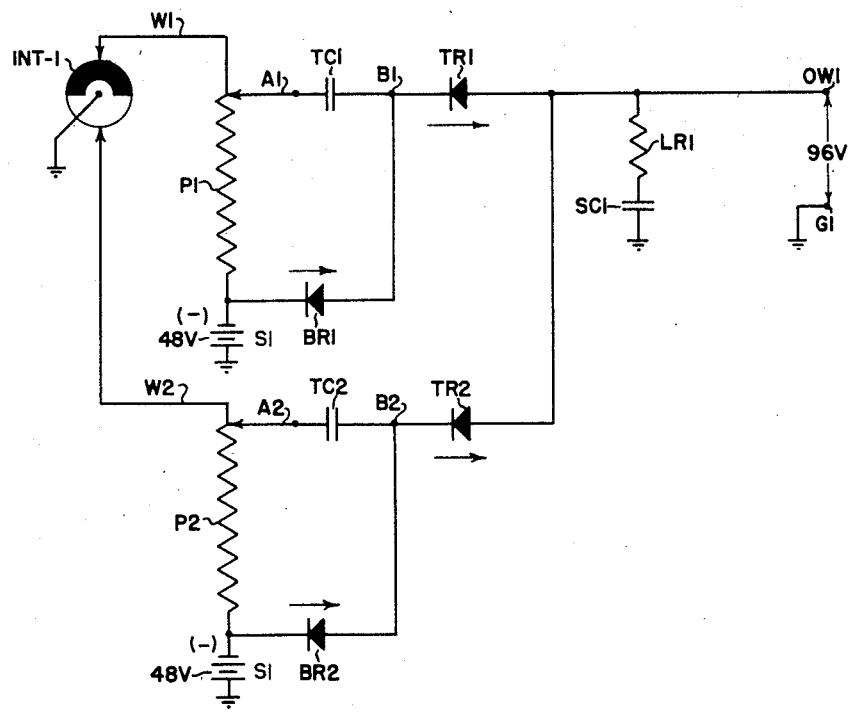

The above-mentioned and other features and objects of this invention and the manner of attaining them will become more apparent and the invention itself will be best understood, by reference to the following description of two embodiments of the invention taken in conjunction with the accompanying drawing comprising Figs. 1 and 2 wherein:

Fig. 1 shows a direct-current controlled voltage multiplier having a multiplying factor of 1.75; and Fig. 2 shows an arrangement for employing two voltage multipliers in push-pull relation to substantially reduce the ripple voltage in the direct-current output without additional control apparatus.

Referring now in particular to Fig. 1 of the drawings, the voltage multiplier shown therein will be described.

The voltage multiplier of Fig. 1 is shown powered from a 48-volt direct-current source and adjusted to a multiplying factor of 1.75 to provide an output voltage of 84 volts. As will be described hereinafter, the output voltage or the multiplying factor of the voltage multiplier is directly controlled by the setting of the control potentiometer P.

The voltage multiplier comprises essentially the two illustrated 48-volt supply conductors (one of which is illustrated as ground) connected to respective poles of the illustrated 48-volt battery (or direct-current source) S, a transfer condenser TC, a storage condenser SC, and control circuits therefor. The conductors connected to terminals B and OW may be termed, respectively, a transfer conductor and a storage conductor. The storage condenser SC assumes an initial charge corresponding to the 48-volts impressed thereacross directly from the power source S, and the transfer condenser TC assumes a charge corresponding to the voltage developed across potentiometer P, the charge of condenser TC being equal to or less than the supply voltage. The voltage multiplier is controlled by an interrupter INT which causes such a portion of the charge on condenser TC to be periodically transferred to the storage condenser SC as is needed to render the resultant charge on condenser SC equivalent to the charged voltage of the transfer condenser, plus the source voltage at S.

If there is a small load (not shown) connected between output terminals OW and G, and if the interrupter INT be assumed to have remained for some time in its illustrated position (with wire W ungrounded), transfer condenser TC stands discharged, with points A and B at the same potential. Current is thus flowing through BR and TR (the arrows showing the electron direction) to supply the voltage of source S (48 volts assumed) across OW and G to the assumed small load, and storage condenser SC stands charged at 48 volts from source S.

When interrupter INT next grounds wire W, slide-arm A of potentiometer P assumes a potential depending upon the setting of arm A. In its illustrated position, arm A is assumed to be so positioned that it assumes a steady-state negative potential of 12 volts to ground when wire W is grounded. Charging current then flows from ground through INT, W, upper section of P, arm A, condenser TC, point B, and through BR, to the free pole of S, charging TC to 36 volts, with point B being 48 volts negative with respect to ground, and 36 volts negative with respect to arm A.

When interrupter INT next removes ground from wire W, current flows only through the lower section of potentiometer P, thus bringing arm A from negative 12 volts to a steady-state negative 48 volts. Because of the 36 volt charge of TC (point B 36 volts negative with respect to A), point B tends to become 84 volts negative with respect to ground, but does not reach that condition on the instant interrupter operation because of a partial discharge of TC through TR into storage condenser SC. Neglecting load consumption, the intermediate negative potential to ground (between 48 volts and 84 volts) assumed by points B and OW and by the upper terminal of condenser SC, is proportional to the respective capacities of TC and SC.

On subsequent groundings and ungroundings of wire W (such as at one interrupter cycle per second), condenser TC is repeatedly charged and partially discharged in the manner described to establish and to maintain the charge on storage condenser SC (and between OW and G) at an effective peak voltage to ground of 84 volts. When this condition is reached, there is only a small discharge of condenser TC when INT opens following a closure, and that discharge is replenished on the next closure of INT.

When TC is discharging through TR into SC, diode BR blocks inverse flow, and when point B drops to negative 48 volts during a charging of TC, diode TR blocks inverse flow. The noted load (not shown) between OW and G is supplied with current solely by SC during a charging period of TC.

The values of the components in the charging and discharging circuits of the transfer condenser TC and the storage condenser SC are so chosen that the RC time constants do not adversely affect the transferring operation, and the repetition rate of the interrupter is so chosen as to maintain a low ripple voltage in the output.

Referring now in particular to Fig. 2 of the drawings, the voltage multiplier shown therein is an improvement over the voltage multiplier of Fig. 1 in that the ripple voltage appearing across the output wires is substantially lessened without a corresponding increase in the repetition rate of the interrupter INT-1. The voltage multiplier is shown as having a multiplying factor of 2.0, resulting in an output voltage of twice the supply voltage.

The 48-volt battery or equivalent direct-current source S1 of Fig. 2 is shown twice to simplify the drawing. It should be understood that only one such source is required, but two similarly poled equivalent sources S1 may be used when available because they are required for other purposes.

In Fig. 2, the interrupter INT-1 has two control wires W1 and W2 associated therewith and so positioned that wire W1 is grounded throughout one-half a revolution of the interrupter and wire W2 is grounded throughout the remainder of the revolution. Each of the wires W1 and W2 has a transfer condenser, a potentiometer, and a control rectifier associated therewith. The transfer condensers associated with wires W1 and W2 are connected through individual isolating rectifiers to a common storage condenser SC1 which is connected to the output wires OW1 and G1.

When wire W1 is grounded, condenser TC1 assumes a charge equal to 48 volts, as point A1 is at ground potential and point B1 is at the power source potential, the arm of the potentiometer being set at its lowest point. When interrupter INT-1 subsequently ungrounds wire W1, the charge on condenser TC1 is transferred to storage condenser SC1 through rectifier TR1 in the manner hereinbefore described with reference to Fig. 1, the transferred charge being prevented from reaching transfer condenser TC2 by the blocking action of rectifier TR2. At the same time that condenser TC1 is discharging, wire W2 is grounded and condenser TC2 assumes a charge equal to the supply voltage as point A2 is at ground potential and point B2 is at battery potential.

When interrupter INT-1 thereafter grounds wire W1 and ungrounds wire W2, the charge on condenser TC2 is transferred to the supply condenser SC1 through rectifier TR2 in the manner described with reference to Fig. 1. At the same time, transfer condenser TC1 is thereupon recharged in preparation for transferring its charge to condenser SC1 on the next one-half revolution of interrupter INT-1. The described operation continues at the repetition rate of interrupter INT-1, the rate at which condenser SC1 receives transfer charges being twice the repetition rate of interrupter INT-1.

In view of the foregoing, it is apparent that if the voltage multiplier of Fig. 1 were powered from the output voltage of the voltage multiplier of Fig. 2, an output voltage of 168 volts could be obtained. Thus, any practical desired output voltage can be obtained by employing several voltage multipliers in tandem relationship, each multiplier succeeding the first being powered by the output voltage of the preceding one.

While I have described above the principles of my invention in connection with specific apparatus, it is to be clearly understood that this description is made only by way of example and not as a limitation to the scope of my invention.

I claim:

1. A voltage multiplier comprising a first and a second supply conductor and a direct-current power source having its poles connected respectively thereto to maintain a given direct-current voltage between them, a transfer and a storage conductor, a first rectifier diode connecting the second supply conductor to the transfer conductor, a second rectifier diode connecting the transfer conductor to the storage conductor, a storage condenser connected between the storage conductor and one of the said supply conductors, a transfer condenser having first and second terminals with its first terminal connected to the transfer conductor, and means for effectively transferring the second terminal of the transfer condenser back and forth between the first and second supply conductors to charge the transfer condenser through the first diode from the second conductor when the connection of the said second terminal is to the first supply conductor, and to discharge the transfer condenser in series with the current source and through the second diode to the storage conductor when the last said connection is to the second supply conductor, whereby the storage condenser is charged in successive increments to establish and to maintain a voltage between the storage conductor and the first supply conductor higher than the voltage between the supply conductors.

2. A voltage multiplier according to claim 1, wherein the charging voltage impressed across the said transfer condenser is equal to the voltage of the said source between the said supply conductors, whereby the peak output voltage impressed between the said storage conductor and the said first supply conductor is equal to twice the said voltage of the said power source between the said supply conductors.

3. A voltage multiplier according to claim 1, wherein the said means for effectively transferring the said second terminal of the said transfer condenser includes voltage-reducing means for varying the charging voltage of the transfer condenser to thereby vary the resultant voltage maintained by the said storage condenser.

4. A voltage multiplier according to claim 1, wherein there is a second transfer conductor with a further pair of rectifier diodes connecting it between the second supply conductor and the storage conductor as specified for the said first transfer conductor, and there is a second transfer condenser with its first terminal connected to the second transfer conductor, and the said means for effectively transferring the second terminal of the first said transfer condenser back and forth between the first and second supply conductors includes means for similarly transferring the second terminal of the second transfer condenser back and forth between the supply conductors in phase opposition with the transferrence with respect to the said first transfer condenser, whereby either transfer condenser is charging at a time when the other is discharging to the storage conductor.

5. A voltage multiplier according to claim 1, wherein the said means for effectively transferring the said second terminal of the said transfer condenser back and forth between the said first and second supply conductors comprises a resistive element continuously connecting the second terminal of the transfer condenser to the second supply conductor, and further includes means for connecting the first supply conductor intermittently to the second terminal of the transfer condenser.

6. A voltage multiplier according to claim 1, wherein the said means for effectively transferring the said second terminal of the said transfer condenser back and forth between the said first and second supply conductors comprises a resistive element interconnecting first and second transfer terminals, circuit means for connecting the second transfer terminal continuously to the second supply conductor, circuit means for connecting the first transfer terminal intermittently to the first supply conductor, whereby the potential on the last said terminal alternates between that of the second and that of the first supply conductor, and circuit means for connecting the second terminal of the transfer condenser to a selected point along the resistive element according to the desired amount by which the voltage between the said storage conductor and the first supply conductor is to exceed the voltage between the supply conductors.

References Cited in the file of this patent
UNITED STATES PATENTS 2,239,786    Jones _____ Apr. 29, 1941